Feb. 7, 1961  JIRO NOTOMI  2,970,382
GYRO-COMPASS
Filed Jan. 14, 1954  7 Sheets-Sheet 3
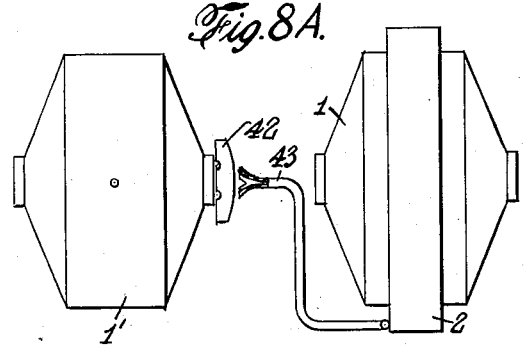
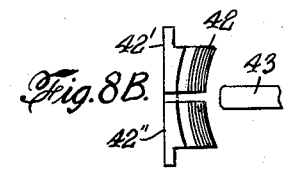
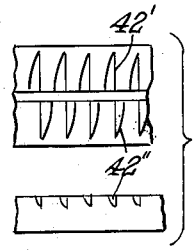
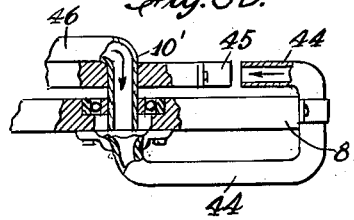
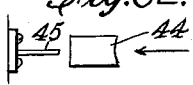
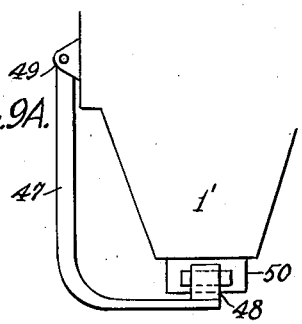
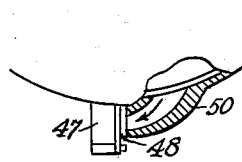
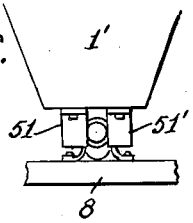
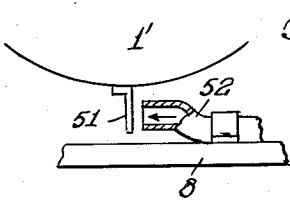

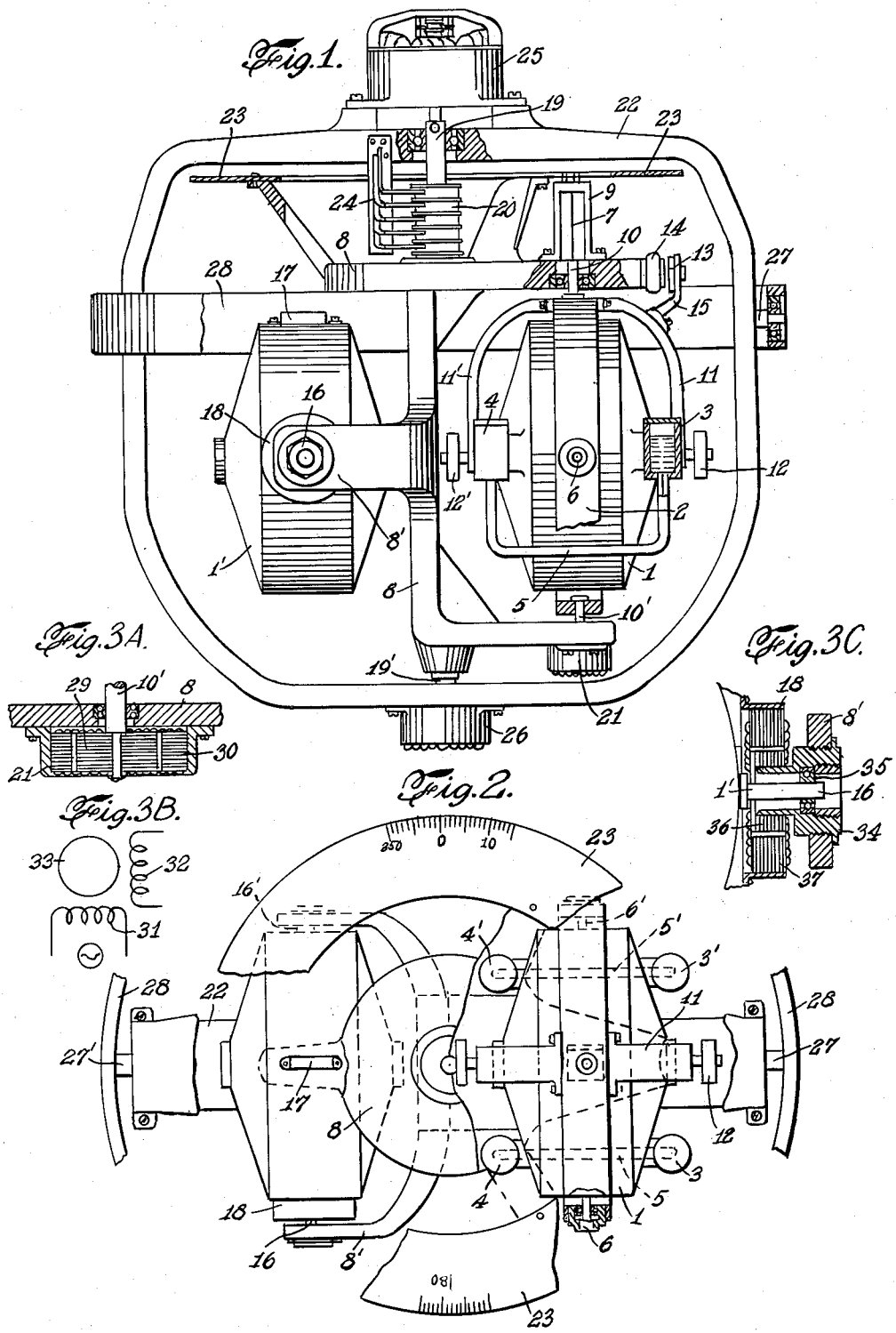

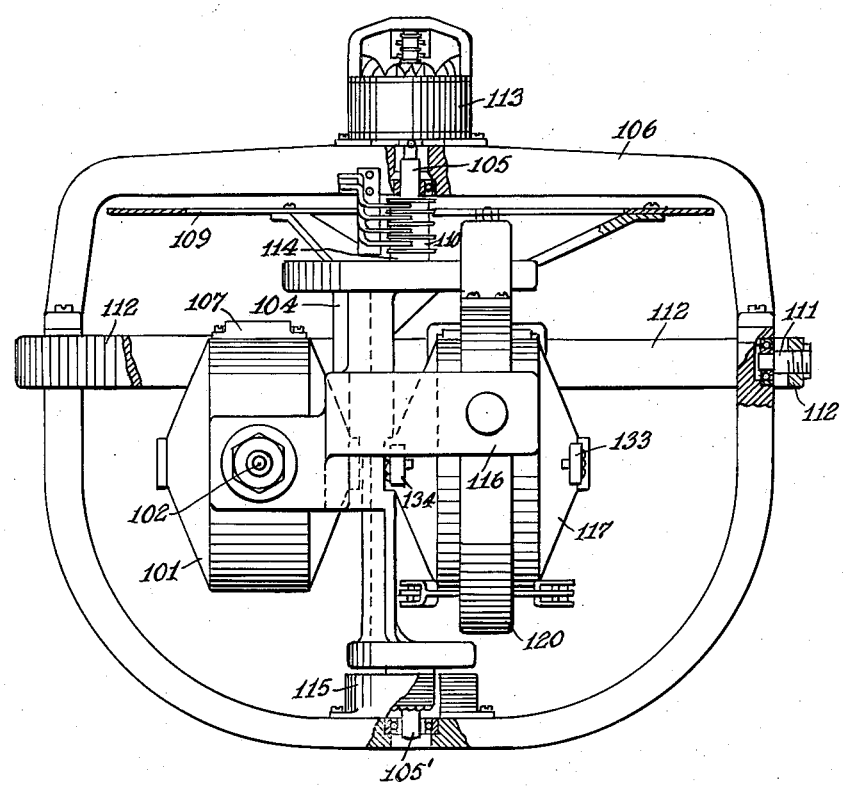

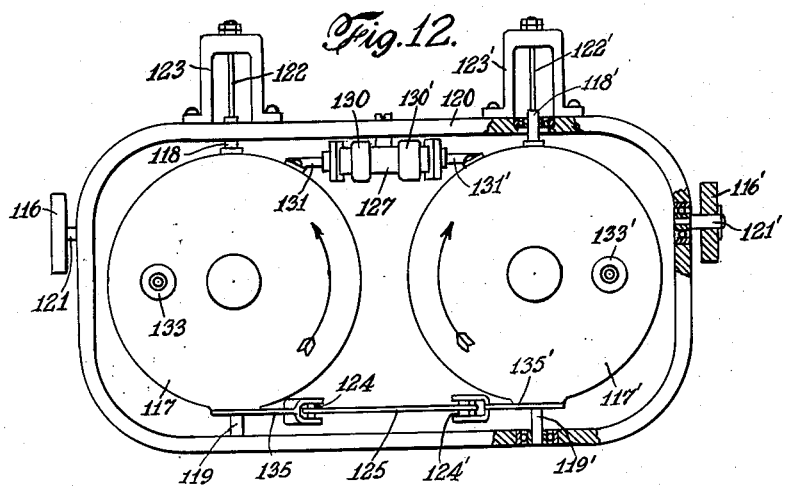
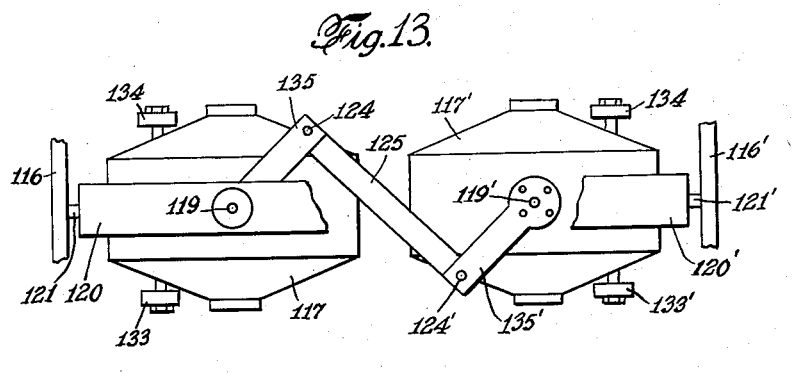
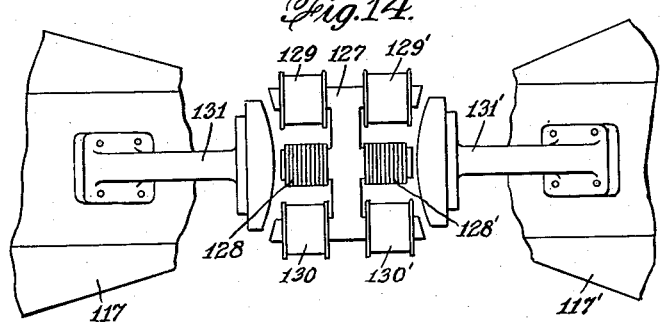

United States Patent Office 2,970,382
Patented Feb. 7, 1961

2,970,382
GYRO-COMPASS

Jiro Notomi, Tokyo, Japan, assignor to Tokyo Keiki Seizosho Company, Ltd., Tokyo, Japan, a corporation of Japan Filed Jan. 14, 1954, Ser. No. 404,104

4 Claims. (Cl. 33—226)

This invention relates to a gyro-compass, and more particularly relates to a gyro-compass comprising a combination of a free gyro and an azimuth-detecting gyro.

It is a feature of the invention that in the combination of a free gyro and an azimuth-detecting gyro the azimuth-detecting gyro is adapted to detect the deviation angle of the free gyro from north, and a torque corresponding to the detected deviation angle is impressed upon the free gyro, whereby a north seeking property is given to the system as a whole.

Another feature of this invention resides in the combination of a free gyro and an ordinary gravity-controlled gyro in which a torque corresponding to the magnitude of displacement between the two gyros is impressed upon the free gyro, whereby a precession to decrease the displacement is generated, and a torque corresponding to this displacement is applied to the gravity-controlled gyro to give a precession to alter the elevation angle of the gravity-controlled gyro in a direction to tend to decrease the displacement.

A further feature of this invention resides in the provision of a gyro-compass comprising a free gyro and an azimuth-detecting gyro assembly composed of two gyroscopes journalled in a casing and interconnected to each other in such manner that their axes can rotate only in opposite directions whereby the azimuth pointed by the casing can be detected although each gyroscope has no north-seeking property, the azimuth-detecting gyro assembly being adapted to detect the deviation of the free gyro from north, and a torque corresponding to the detected deviation angle is applied to the free gyro so that a north seeking property is given to the system as a whole.

In a gyro compass of the type used heretofore, a gravity-responsive device is provided in such a manner that the deviation angle of the gyro due to acceleration is equal to or nearly equal to the amount of change of the velocity error in order to prevent an acceleration error. Consequently, the period of eastward and westward oscillations of the gyro is increased to a long period of about 85 minutes, requiring a long period to settle the gyro on the meridian, so that the manipulation of the gyro becomes inconvenient.

Furthermore, in gyros of this type, a heavy load can not be applied upon the vertical axis of the gyro because the so-called north-seeking force is extremely week, so that a follow up device is necessitated, whereby the construction is complicated or its manipulation is inconvenient.

According to the present invention, the precession of a free gyro is employed to return the gyro to the meridian or to a predetermined set position, the defects inherent in heretofore used devices are eliminated, and the period of damped oscillation when the main gyro is returned to the meridian can be made shorter without increasing the error due to acceleration. Therefore, when the gyro is deviated from the meridian, it can be returned to the meridian-pointing position in a shorter time interval than heretofore. Furthermore, in accordance with this invention, a follow-up device is not necessitated when the gyro-compass is connected to an auxiliary compass, the construction of the gyro-compass is simplified and its manipulation is conveniently effected.

Although the embodiments shown and described herein relate to the application of the invention to the gyro-compass used on ships, the invention is not limited to gyro-compasses for use on ships, but may be embodied in gyro-compasses used in airplanes or in other mobile vehicles.

The invention will be described with reference to the accompanying drawings in which, Fig. 1 is a side elevation showing a gyro compass embodying features of the present invention;

Fig. 2 is a plan view of the gyro-compass of Fig. 1 partly broken away;

Fig. 3A is a cross-sectional view of a torque generating device;

Fig. 3B is a wiring diagram of the device shown in Fig. 3A;

Fig. 3C is a cross-sectional view of a modified torque generating construction;

Fig. 8A is a side elevation of a modified form of the torque-generating device employing pneumatic means;

Fig. 8B is a plan view of a portion of the device of Fig. 8A showing the relation between the air injection pipe and the air pressure-receiving plate;

Fig. 8C shows a developed front view and side view of the air pressure-receiving plate of Fig. 8B;

Fig. 8D is a longitudinal sectional view of another embodiment of a torque-generating device;

Fig. 8E shows the relation between the air injection pipe and the air pressure receiving plate in the embodiment of Fig. 8D;

Fig. 9A is a front elevation of an embodiment of a torque-generating pneumatic device for correcting the inclination;

Fig. 9B is a side elevational view of the embodiment of Fig. 9A;

Fig. 9C is a front elevation of another embodiment;

Fig. 9D is a side elevation of the embodiment of Fig. 9C;

Fig. 10 is a side elevation of another embodiment of the gyro-compass of the invention;

Fig. 12 is a front elevation of an azimuth detecting element in the embodiment of Fig. 10;

Fig. 13 is a bottom view of the embodiment shown in Fig. 12, the vertical ring being partly broken away;

Fig. 14 shows a detail of the deviation angle detecting device of the embodiment of Fig. 10;

Fig. 15 shows the wiring diagram of the device shown in Fig. 14;

Figure 4:
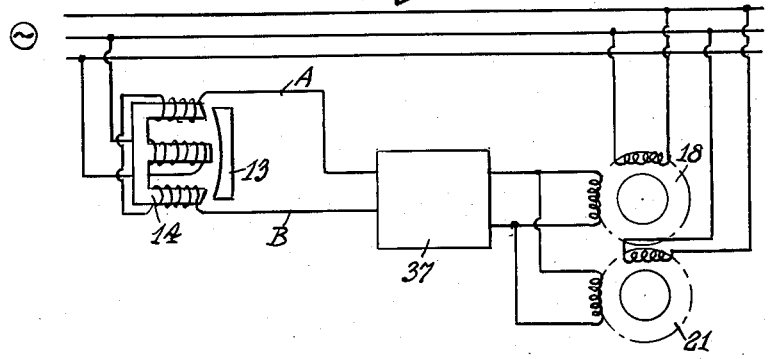
Fig. 4 shows a circuit diagram for an angular displacement detecting device.

Referring to the drawings, in the interior of the gyro case 1, there is disposed the rotor (not shown) of a gyro having a generally known construction in which the rotor is rotatably supported by ball bearings, and the axis of rotation is maintained substantially horizontal. The gyro case 1 is supported within a vertical ring 2 by horizontal studs 6, 6', about which it is free to incline.

Pairs of liquid containers 3, 4 and 3', 4' are mounted on gyro case 1, these containers being filled with a suitable liquid such as mercury, and the containers of each pair are connected by tubes or pipes 5 and 5' in order to construct a generally known gravity control device of the liquid type. The vertical ring 2 of gyro case 1 is suspended by a piano wire 7 from a fixture 9 secured to a frame body 8, and has upper and lower axles 10 and 10', respectively, carried by the frame body 8, ring 2 being adapted to deviate freely about the axles 10 and 10'. Brackets 11 and 11' are attached to vertical ring 2 and weights 12 and 12' are fixed to the ends of these brackets in order to balance the moment of inertia of the vertical ring. Reference numerals 13 and 14 designate the parts of a device for detecting angular displacement, by means of which the relative angular displacement between the gyro 1 and the frame 8 can be detected when gyro 1 deviates from frame 8. In this embodiment, 14 represents specifically a transformer and 13 is a soft iron piece disposed opposite it. Transformer 14 is secured to the frame and piece 13 is secured to the bracket 11, and thus to vertical ring 2, by a bracket 15. An air gap is provided between elements 13 and 14, so that no mechanical contact exists therebetween. The center of gravity of the total unit carried by vertical ring 2 and comprising gyro case 1, liquid containers 3, 4, and 3', 4', and mercury, lies upon the axis of vertical axles 10 and 10'.

Brackets 8' project from frame 8 on the side opposite gyro case 1, and the ends of brackets 8' support another gyro case 1' horizontally by axles 16, 16' in such manner that case 1' can freely incline about the axis of axles 16 and 16'. A device 17 such as a mercury switch which responds to such inclination, is mounted on gyro case 1'. A torque generating device 18 which impresses a torque about axis 16 and 16' in order to control it, is mounted on gyro case 1'. The center of gravity of gyro case 1' and portions attached to it, lies upon the axis of axles 16 and 16'.

The frame 8 is supported within an outer frame 22 by vertical axles 19 and 19', and can freely turn about axles 19 and 19'. A compass card 23 is provided at the top of the vertical axle 19, and by means of a slip ring 20 mounted upon vertical axle 19, the electric circuits necessary to control the spinning of the gyro or the like are made through brushes 24 attached to the outer frame 22. Another torque generating device 21 is mounted upon the under side of the lower vertical axle 10' of the gyro case 1, and device 21 cooperates with the angular displacement detecting device 13, 14. A selsyn transmitter 25 is attached to the top of the outer frame 22, and the rotor of transmitter 25 is coupled to the axle 19 in order to transmit the azimuth angle, and another torque generating device 26 is mounted upon the lower axle 19', device 26 being connected to the inclination responsive device 17. The outer frame 22 is supported from a gimbal ring device 28 by horizontal shafts or axles 27 and 27'.

The center of gravity of the total unit comprising the frame body 8 and gyro cases 1 and 1' lies upon the axis of vertical axles 19 and 19'. Since the center of gravity of gyro case 1' lies upon the axis of axles 16 and 16', the gyro 1' is a so-called free gyro which is not affected by gravity either about its horizontal axis or about its vertical axis.

The construction and operation of the torque generating devices 18, 21 and 26 will now be described. These three devices in the embodiment illustrated have the same construction and include an electric induction motor. Fig. 3A shows the torque generating device 21 provided at the under side of the main gyro 1, in which 29 is the rotor of an induction motor, which may be either of the cage type or of the winding type, and rotor 29 is secured to the shaft 10'. The stator 30 is mounted on the frame 8, and has a two-phase winding as shown in Fig. 3B. Stator winding 31 is excited constantly by an A.C. current supply and 32 is a control winding. When an exciting current having a phase difference but with the same frequency as the exciting current of winding 31 is made to flow through winding 32, a rotating field will be generated and a torque is imposed upon rotor 33. When the phase of the current flowing through winding 32 is inverted, the direction of rotation of the rotating field is reversed, and an opposite torque is created. Obviously, when the magnitude of the current is varied, the strength of the torque is correspondingly varied. The torque generating device 26 may have the same construction as the device 21, and therefore its detailed description is unnecessary. The torque generating device 18 may have the construction shown in Fig. 3C. As seen in the drawing, a ball bearing 35 is carried in a ball bearing housing 34 which is threadedly mounted upon supporting brackets 8', and ball bearing 35 supports the horizontal axles 16 and 16' of the gyro case 1'. A stator 36 is mounted upon support 34 and a rotor 37 is secured to gyro case 1'. It will be clear from the above description that even though the positions of the stator and rotor in torque generating devices 21 and 26 are inverted, the operation remains the same.

The operation of the angular displacement detecting device 13 and 14 will now be described with particular reference to Fig. 4, in which 14 is an E-shaped iron core with a longer central leg, and a primary winding is wound upon the central leg, and two secondary windings, connected differentially, are wound upon the left and right legs of the iron core. Therefore, when the iron piece 13 is in a central position relative to the iron core 14, the magnetic fluxes passing through the left and right secondary windings are equal, and the secondary voltages are also equal in the two windings, cancelling each other to produce no voltage across terminals A and B. When the iron piece is deflected to either side, the secondary voltages are unbalanced and a voltage equal to the difference between the two secondary voltages will be generated across the terminals A and B. The magnitude of the generated voltage will be approximatley proportional to the displacement of the iron piece and the phase of the voltage will be reversed by 180 degrees depending upon the direction of said displacement. The control voltage generated across terminals A and B is amplified by a suitable amplifier 37, and the output from amplifier 37 is impressed upon the control windings of torque generating devices 18 and 21. As shown in Fig. 4, when the stationary windings of the respective torque generating devices and the primary winding of the control transformer are excited from different phases of a three phase trunk line, or when the alternating magnetic fields generated by the stationary winding and the control winding are given a phase difference according to the variation of phase produced by the amplifier, a rotating magnetic field is produced and torques may be impressed upon the rotors of devices 18 and 21. Thus, when the iron piece 13 is displaced with respect to the frame 8, that is, when the main gyro 1 is deviated relative to frame 8, torques may be accordingly applied to the vertical axis of the main gyro 1 and to the horizontal axis of the free gyro. It is clear that the relation of the direction of deviation of the main gyro relative to the frame to the direction of torque may be suitably selected by the polarity of the electric connection. In the embodiment described, a torque of the same direction as that of the deviation is applied by the torque generating device 21, to the main gyro 1, and the free gyro 1' is given a precession in such manner that it moves the frame 8 to follow up the deviation of the main gyro 1 from the frame body 8.

The north seeking function will now be described. For purposes of easy understanding, it is assumed that a weight is mounted on the lower side of the gyro case 1 in place of a liquid type gravity control device and the torque generating device 21 is not provided. It is clear from the general theory of the gyro compass that a liquid gravity control device is similar in its north pointing operation to a system employing a weight.

Figure 5A:
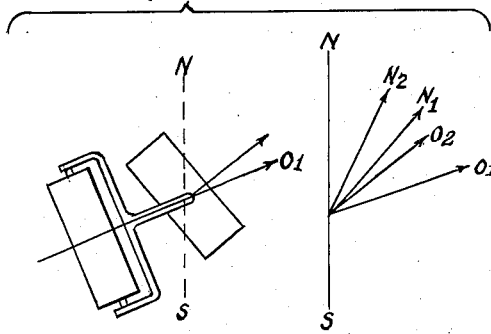
Figs. 5A and 5B are diagrams showing the north-pointing action according to the invention.

The frame body 8 is assumed to be deviated from north to a direction $O_1$, as shown in Fig. 5A, for example. When the gyro 1 is provided with a suitable damping device of a type generally known, the gyro 1 tends to settle at a position pointing north, that is, N in Fig. 5A, but due to the elasticity of the suspending piano wire 7, it settles in a position pointing $N_1$, thus being deviated from N. This position is a balanced position in which the so-called north seeking force which acts to direct the shaft of the gyro to N and the elastic force of the piano wire, which acts to direct the shaft to $O_1$, are balanced. By means of the torque generating device 18 a torque corresponding to an angle $O_1N_1$ is applied upon the free gyro 1', and free gyro 1' is caused to have a precession, the shaft of gyro 1' being moved toward N, and from $O_1$ reaches $O_2$. Then as the elastic force of the piano wire is decreased, the main gyro 1 moves more nearly to N than $N_1$, and tends to settle at $N_2$. But the free gyro 1' is caused to have a further precession, and since the angle $O_2N_2$ is obviously smaller than the initial angle $O_1N_1$, the speed of precession becomes slower. These movements are generated repeatedly until both gyros coincide and are in neutral equilibrium in a neutral position indicating or pointing N, that is, north, and they settle at this constant azimuth when no force becomes applied to either one of the gyros.

Figure 5B:
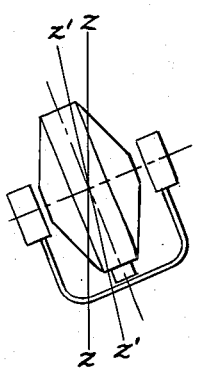

The operation as above stated is the basic principle of this invention, and its practical operation is as follows. When, for example, the entire device is deviated eastward and released, an inclination is generated at first in the axis of the main gyro 1 due to the movement of the earth's surface according to the rotation of the earth, and upon this inclination, a moment of gravity acting on the weight is applied upon the gyro 1, which is thereby given a precession toward north, so that it deviates westwardly relative to the frame body 8. Therefore, the free gyro 1' by the response of device 18 begins to have a precession toward north following the main gyro. Since the main gyro 1 is not provided with a damping device as employed in the gyro-compasses heretofore used, its motion tends to make an undamped oscillation about direction $N_1$ in Fig. 5A. But, since the frame body 8 moves in the same direction at the same time, point $N_1$ will also move in the same direction. That is to say, the movement of the main gyro 1 relative to the frame body 8 is an oscillation in which the neutral point of oscillation moves in the direction of initial north-seeking deviation of the main gyro. It will be easily understood that a damping operation is effected when the speed of movement of the neutral point is suitable, and this is similar to the action of a viscous liquid type damping device. For example, when a gyro is inclined in the manner shown in Fig. 5B, the viscous liquid moves from a container on one side to that on the other side, and the neutral point of the oscillation of the inclination of the gyro moves from the vertical line Z—Z to the vertical line Z'—Z'. When the speed of flow of the viscous liquid is suitably selected, it is clear that it effects a damping action. In the gyro-compasses used heretofore, a motion is effected in which the inclination of the axis of the gyro and the deviation of azimuth are related to each other, and by damping one of them, another motion also receives a damping action.

In this invention, it is clear that the three factors, that is, the inclination of the azimuth detecting gyro 1, its deviation relative to the frame body 8, and the deviation angle of the free gyro 1' make a correlated movement, and it will be understood readily that, when one of them is damped, the others are also damped. According to the above stated description, one can understand that each of gyros 1 and 1', and therefore frame body 8, comes to rest pointing north. The effectiveness of the damping action is determined by selecting the speed of precession of the free gyro 1', that is, the intensity of torque of the torque generating device 18, at a suitable value.

In the above description, it has been assumed that a weight is attached to the gyro case 1 as the gravity control device, but it is obvious that when a liquid control device is used in this invention, it will provide the same action when the direction of rotation of gyro 1 is reversed, or its vector of rotation is directed southwardly. But in this case, it is necessary that a torque having the same direction as the deviation and opposite to the elastic force be exerted upon the main gyro 1 by a torque generating device 21 in place of the elastic force of a piano wire. This is possible by reason of the fact that the force exerted on the gyro by a liquid control device due to its inclination is opposite to that exerted by a weight or pendulum.

Figure 6:
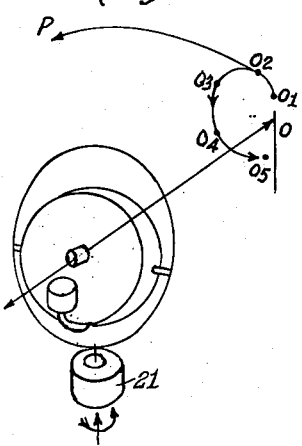
Fig. 6 is a diagram showing the manner in which a gyro is returned to its original position by the action of a torque acting on it when it has been deviated.

Reference will now be made to the action of the torque generating device 21. When the frame body 8 is deviated from north, for example, eastwards, and the gyro 1 is arranged in a central position relative to frame body 8 and placed horizontally, and then it is assumed that the frame is released, gyro 1 undergoes an inclination at first due to the movement of the earth surface by reason of the rotation of earth, and the north pointing side of the gyro rises upward. By this action, mercury in the liquid control device moves toward south, making the south side of gyro 1 heavier. Since the direction of the vector of rotation is to be southward, the gyro makes a precession toward north by the known principles of the gyroscope, and it deviates toward the west relative to frame body 8. As the result of this action, a torque having an upward vector is applied by device 21 to the gyro through ring 2 and shaft 10. Therefore the gyro 1 makes a precession to lower the north side. In Fig. 6, the north pointing side of the gyro 1 is projected on the vertical plane of the paper, and the conditions of its motion are shown. That is to say, it is initially pointed toward the central and horizontal position O relative to the frame body, but it moves by producing an inclination at first to $O_1$, then it goes to $O_2$ by the addition of a westward deviation, and then comes to $O_3$ by decreasing its inclination due to the action of torque created by the torque generating device 21. Since this torque has an upward direction during the period when the gyro 1 is deviated westward relative to the frame body 8, the movement of inclination of the gyro proceeds in the same direction and it reaches point $O_4$ and the north pointing side begins to drop below the horizontal. Thereupon, mercury flows toward the northward direction, and main gyro 1 makes a precession toward east, coming to point $O_5$. In contrast to this action it is necessary for conventional gyro compasses without torque generating devices, to be deviated to the opposite side, passing over the meridian, as shown by a curved line OP, in order to reverse the inclination of the gyro axis. Therefore, according to this invention, the period of oscillation can be reduced even when employing the same gravity control device, as heretofore used, and it also can be determined at will by varying the intensity of the torque of the torque generating device 21.

Figure 7:
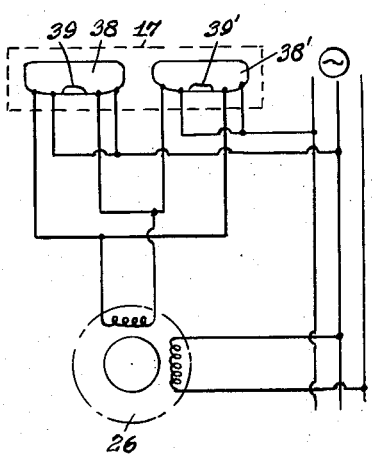
Fig. 7 shows the circuit diagram of an anti-tilting device.
Figure 11:
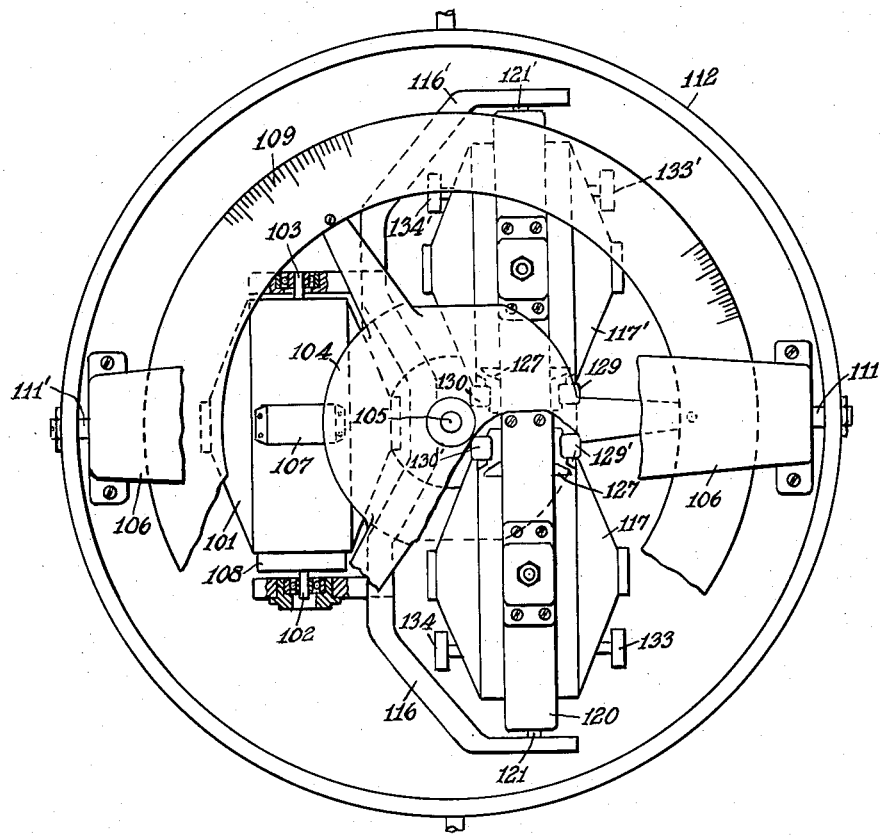
Fig. 11 is a plan view of the embodiment of Fig. 10.
Figure 16:
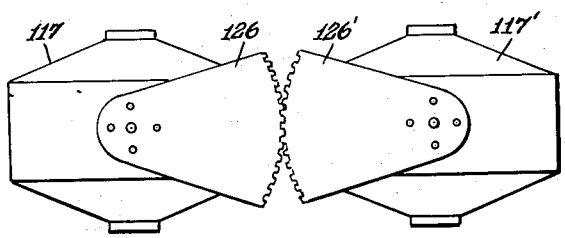
Fig. 16 is a bottom view of a modified coupling means in the azimuth detecting gyro.

As illustrated in Fig. 7, the torque generating device 26 for the frame 8 is controlled by the inclination responsive device 17 on the free gyro case 1'. The device 17 comprises cavities 38 and 38' having curved lower walls in which there are provided electrical contacts connected in a control circuit as shown in Fig. 7. Bodies of mercury 39 and 39' are movable by inclination of the device 17 to connect electrically predetermined contacts depending on the direction of tilt. As in the torque device 21 described above, one coil of the torque device 26 is connected across one phase of a supply line while the other coil is connected to another phase when the device 17 tilts, the direction of the latter connection being reversed with the reversal of the directions of tilt.

The velocity error of the gyro-compass of the invention is similar to that caused in the conventional compass. This is because the velocity error is an error caused by the south and north components of motion of a mobile vehicle, and it has no relation to the construction of the gyro compass.

The acceleration error will be discussed below. When an acceleration is generated, the mercury in a gravity control device is caused to move, and a precession is generated in the gyro 1, deviating it from the frame body 8, and thereby a precession is given to the free gyro 1', causing a deviation in it. Therefore, the magnitude of deviation of the free gyro 1' is always smaller than that of the gyro 1. Since the magnitude of deviation of the gyro 1 is determined by the gravity control device, the magnitude of deviation due to acceleration can be made to be no different from that of a conventional gyro-compass, by employing the same gravity control device. As will be apparent from the above description, since the gyro device according to this invention can reduce its period independently of the gravity control device, any error which may temporarily be generated can be damped in a short period of time, so that any such error will not interfere with navigation.

Although in the embodiments described above, an electro-magnetic force is used to energize the torque generating devices 18 and 21, other suitable devices can be used without limitation, such as the devices using pneumatic pressure, for example, as shown in Figs. 8A to 8E. Fig. 8A shows a side elevation of one of such devices, in which an injection pipe 43 having upper and lower nozzles is attached to the vertical ring 2, and an air pressure receiving apparatus 42 opposite pipe 43 is attached to the free gyro casing 1'. Fig. 8B is a plan view of such an arrangement, and the air pressure receiving apparatus 42 is shown as having a concave surface, provided with air pressure receiving blades 42' and 42" having opposite pitch formed on both sides of said surface. A developed view of the blades is shown in Fig. 8C showing the blades on both sides as having opposite directions. The end of the injection pipe 43 points toward the center of the receiving apparatus 42 when the gyro 1 is in its center position relative to the frame 8. Then the air streams injected from injection pipe 43 are impressed equally upon the blades on both sides, and a torque cannot act upon the free gyro 1', but when the vertical ring 2 is deviated, the end of injection pipe 43 is also deviated relative to the blades of the receiving apparatus, applying more pressure on one of the blades than on the other. As a result, a torque is applied around the horizontal axis of free gyro 1. The effect is similar to that of the electro-magnetic force described above.

As the source of the pressure air stream, one may employ the pressure air stream generated by the rotation of the gyro and introduced from the gyro case 1 by known means or one may employ a separate source of pressure air. Figs. 8D and 8E show another embodiment in which an air stream is used as the torque generating device 21. In this embodiment, the lower vertical shaft 10' of the vertical ring 2 is hollow, and the air stream projected from gyro case 1 is led to a pipe 46 and delivered to an air injection pipe 44 through hollow shaft 10' from which it is projected upon the air pressure receiving plate 45. Receiving plate 45 is attached to the vertical ring 2 in such manner that plate 45 is in parallel with the air stream when the vertical ring 2, that is, gyro 1, is in a central position relative to the casing 8. When the vertical ring 2 deviates relative to the casing 8, the receiving plate 45 deviates from its position parallel to the air stream, receiving a force corresponding to the deviation, whereby the vertical ring 2 receives a torque having the same direction as that of the deviation. When a separate source of air pressure is used, it is sufficient to conduct the air stream from the source of air pressure to an air delivering pipe 44 directly.

An air stream can also be used as a torque generating device 26 for correcting the inclination of a free gyro 1'. As shown in Figs. 9A and 9B, a pendulum 47 is attached to the free gyro case 1' by means of a post 49, and a regulating plate 48 is secured to the end of pendulum 47. A nozzle 50 having a wide opening is also provided upon the free gyro casing 1' to inject an air stream generated by the rotation of the free gyro. Therefore, the opening of nozzle 50 is divided into two portions on both sides of the regulating plate 48. When plate 48 is placed in the center position relative to the nozzle, the areas of the opening of the nozzle on both sides of the plate are equal, but when the free gyro 1' is tilted, the opening of the nozzle deviates to either side relative to the plate, thereby making the injecting air streams unequal. Therefore, the reactive forces of the air streams become unequal on both sides, giving a vertical torque to the free gyro 1'. This method of operation is well known in gyroscopes for airplanes.

Figs. 9C and 9D show an embodiment in which a separate source of air streams is used. An air stream led from a source of air pressure is injected upon pressure receiving plates 51 and 51' attached to the free gyro casing 1' by mounting an air delivering pipe 52 on the frame 8. When the free gyro 1' is tilted and pressure receiving plates 51 and 51' deviate in either direction relative to the nozzle of pipe 52, the pressures received by the plates 51 and 51' become unequal, generating a vertical torque. Therefore, in either case, the inclination of the free gyro 1' can be corrected.

In the previously described embodiments, the direction of the rotational axis of the free gyro 1' is in parallel with that of the gyro 1, but the direction of the rotational axis of the free gyro may take an arbitrary position, because the free gyro 1', according to the general property of a gyroscope, maintains its direction of rotation except for slow drift due to the earth's rotation and friction effects, fixed in azimuth, which property is independent of the direction initially given. Therefore, it may be arranged on frame 8 perpendicular to or at any other angle relative to the gyro 1.

In order to give a precession following the deviation of the gyro 1, it is sufficient to mount a torque generating device upon its horizontal axis, whereby entirely the same operation can be obtained.

A modification of this invention will be described with reference to Fig. 10 to Fig. 18. In these figures, 101 is a casing for a free gyro, within which a gyro is mounted so as to rotate freely about a horizontal axis. Horizontal supporting shafts 102 and 103 arranged perpendicular to the horizontal rotating axis are provided upon the free gyro casing 101, and these supporting shafts are supported by a frame body 104 which is journalled to the outer frame 106 by vertical shafts 105 and 105'. Upon free gyro casing 101 an inclination responsive device 107 and a torque generating device 108 are mounted. A compass card 109 and slip rings 110 are attached to the frame body 104, and the outer frame 106 is mounted upon a gimbal ring 112 by horizontal shafts 111 and 111'. Furthermore, a selsyn transmitter 113 is secured to the upper side of the outer casing 106, the rotor of the transmitter being coupled to the vertical axis 105 of the frame body 104, and brushes 114 mounted upon the outer casing 106 are associated with slip rings 110 in order to define electric circuits. At the lower part of outer frame 106, a torque generating device 115 is provided, the rotor of this device being mounted upon the lower vertical shaft 105', and device 115 is associated with the inclination responsive device 107 mounted upon the gyro casing 101 so as to be controlled by it, whereby torque is applied to the frame body 104, that is, to the free gyro casing 101, for correcting its inclination.

Supporting arms 116 and 116' are provided on the frame body 104, and an azimuth detecting element is mounted on these arms. The azimuth detecting element comprises two gyros, which have substantially equal magnitude of angular momentum and which have horizontal rotor axes substantially parallel to each other under normal conditions. As shown in Figs. 12 and 13, the gyro cases 117 and 117' containing the gyros are provided with vertical shafts 118, 119 and 118', 119', respectively, these shafts being supported rotatably within a vertical ring 120, which is journalled above the center of gravity of the ring and parts supported thereby to arms 116 and 116' by horizontal supporting studs 121 and 121'. To the upper vertical shafts 118 and 118' of respective gyro cases 117 and 117' piano wires 122 and 122', respectively, are attached, and these wires are suspended from supporting bodies 123 and 123' mounted upon vertical ring 120. The gyros contained in respective gyro cases 117 and 117' are arranged to rotate oppositely about their horizontal rotating axes as shown by the arrows in Figs. 12 and 17, and the respective gyro cases are arranged to deviate only in opposite directions about their vertical axes. For this purpose, the gyro cases 117 and 117' are coupled to each other by a suitable coupling mechanism. The embodiment shown in Figs. 12 and 13 has a link mechanism employed for the coupling mechanism, in which arms 135 and 135' are secured and extend in opposite directions at the lower ends of gyro cases 117 and 117', respectively pivots 124 and 124' provided at the free ends of arms 135 and 135', respectively are connected by a connecting rod 125. In this construction, gyro cases 117 and 117' can deviate in opposite directions only when the deviation angle is not excessively large, and can not deviate in the same direction. In this coupling mechanism, it is preferable to connect the gyro cases in such manner that respective rotating axes of gyro cases 117 and 117' are, under normal conditions, parallel to each other and perpendicular to the plane containing the vertical ring 120.

The coupling between two gyro cases is not limited to the link mechanism described above, but the system shown in Fig. 16, for example, may be employed, in which sector gears 126 and 126' in mesh with each other are attached to the lower ends of gyro cases 117 and 117', respectively. The piano wires 122 and 122' suspending respective gyro cases 117 and 117' are adjusted in such manner that no twisting forces exist at the neutral position.

According to this invention, the device shown in Figs. 12, 14 and 15 is employed to detect the deviation angle when gyro cases 117 and 117' are deviated in opposite directions from the neutral position. Iron core 127 has three legs on both sides, and coils 128, 128'; 129, 129' and 130, 130' are mounted, respectively, on each leg, as shown, to define an electro-magnetic device, the iron core being fixed upon the vertical ring 120. Armatures 131 and 131' are mounted upon gyro cases 117 and 117', respectively, in order to cooperate with the electromagnetic device, and suitable air gaps are provided between the armatures and the iron core, in order to prevent mechanical contacts between them. Coils 128, 128'; 129, 129' and 130, 130' are connected, respectively, in series as shown in Fig. 15, coils 129, 129' and 130, 130' being connected differentially, and the output terminals E and E' are connected to a suitable amplifier 132. The output of the amplifier is connected to the control winding of the torque generating device 108 as stated above, and coils 128 and 128' are excited from a suitable A.C. source. Therefore, when the gyro cases 117 and 117' deviate from the neutral position, a voltage corresponding to the magnitude of their deviation will be generated across the terminals E and E', and since this voltage is applied to the torque generating device 108 through the amplifier 132, a control torque will be generated in it.

The azimuth detecting element constructed as above described has a suitable pendulous moment about the horizontal shafts 121 and 121'. The magnitude of this pendulous moment should be selected so as not to increase excessively the magnitude of deviation of gyros 117 and 117' due to acceleration.

Figure 17:
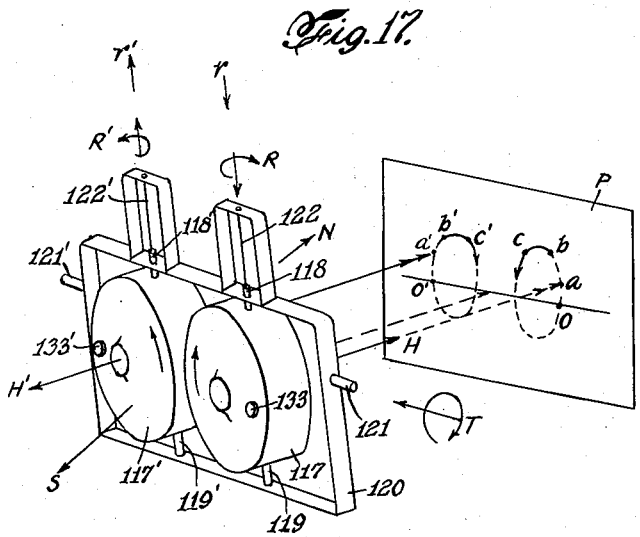
Fig. 17 is a diagrammatic perspective view showing the operation of the azimuth detecting device.

The operation of the azimuth detecting element will be described with reference to Figs. 17 and 18. It is assumed that, initially, the azimuth detecting element is, for example, deviated eastwardly, the vertical ring 120 being maintained vertically, and gyro cases 117 and 117' being maintained at a neutral position, that is, at the position in which the two rotating axes are parallel to each other, and that in this condition the element is released. As is known generally, the horizontal surface at any point on the earth rotates about the meridian, that is, making the N-S line the axis of rotation due to the rotation of the earth, while the rotating axis of a gyro maintains its direction fixed in space. Therefore, inversely seen, the rotating axis of the gyro is caused to incline with respect to the surface of the earth. Now, let the rotating axes of gyros 117 and 117' be projected on a vertical plane to describe the loci of their movements. Initially, they depict points O and O' because the vertical ring 120 holds a vertical attitude at first, then as they incline with respect to the surface of the earth, the projections move to points $a$ and $a'$. Thus gyro cases 117 and 117', together with the vertical ring 120, incline about a horizontal axis through 121 and 121'. Now, since the centers of gravity of these elements are below the horizontal axis, a torque T is generated which corresponds to the angle of inclination about the horizontal axes 121 and 121', which torque acts on the gyros within gyro cases 117 and 117', thereby causing them to precess respectively.

Figure 18:
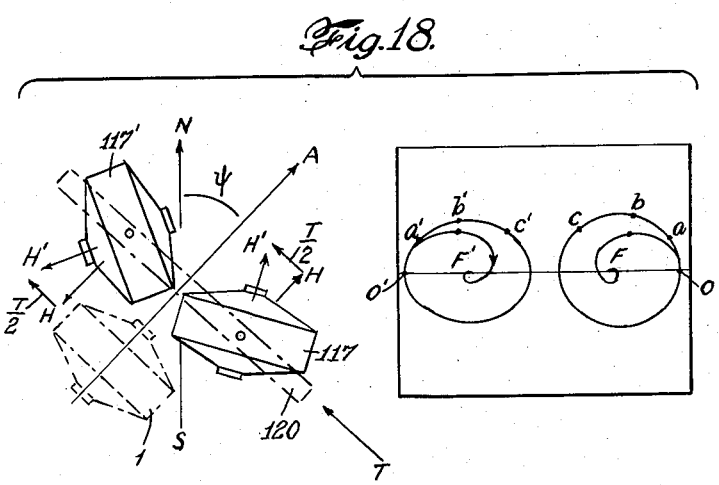
Fig. 18 is a diagrammatic representation showing the operation of the azimuth-detecting device of the embodiment of Fig. 10.

As shown in Fig. 18, if we denote the rotating axes of each gyro by H and the above-mentioned torque by T, a torque of T/2 acts on each gyro to direct its rotating axes to H'. (This movement of deviation occurs freely in opposite directions.) Therefore each gyro passes point $b$ or $b'$ on the vertical plane P in Fig. 17. When the gyro cases 117 and 117' deviate, the piano wires 122 and 122' suspending the cases are twisted, effecting elastic forces of twist, whereby torques R and R' are applied about the vertical axes of gyro cases 117 and 117', as shown in Fig. 17. As a result, both gyro cases are caused to precess in the direction which decreases the inclination angle, and reach points C and C'. In this manner they continue as undamped oscillations describing ellipses on the vertical plane P. Such is the case when no damping weight is attached to the respective gyro cases, but if damping weights 133, 134 and 133', 134' are mounted on gyro cases 117 and 117' as shown in the drawings, other torques $r$ and $r'$ are generated around the vertical shafts 118, 119 and 118', 119' of the gyro cases as shown in Fig. 17 when the vertical ring 120 and gyro cases 117 and 117' are inclined, as above stated, and these torques act to decrease the angle of inclination, thereby damping the undamped oscillations. When the loci of these movements are described on the vertical plane P, they will define the lines shown in Fig. 18, and settle at points F and F'. These deviation angles OF and O'F' are determined by the following relation.

When the velocity of rotation of the earth is taken to be $\Omega$, the latitude of the position is taken to be $\varphi$, the azimuth angle of the azimuth detecting element, that is to say, angle AN in Fig. 18 is taken to be $\psi$, the elastic coefficient of twist of the piano wire (modulus of rigidity) is taken to be $f$, and the angular momentum of gyros 117 and 117' is taken to be H, the following equation exists.

$$\frac{f \times \text{angle } OF \text{ (or } O'F')}{H} = \Omega \cos \varphi \sin \psi \qquad (1)$$

The right side of this equation represents the velocity of inclination in the direction of A in Fig. 18 due to the rotation of the surface of the earth at this position with respect to space, and the left side represents the velocity of precession to incline the rotating axes with respect to space by the effect of the torque generated by the elastic force of the piano wires 122 and 122' due to the deviation OF, OF' of the gyros 117 and 117'. The equality of these two quantities means that there exists no relative movement, that is, it indicates that the gyro cases are at rest with respect to the earth's surface. Therefore it is clear that the deviation angle is determined by an azimuth angle $\psi$ pointed by the azimuth detecting element. In this case, the discrimination between eastward and westward deviations will be given by the sign, plus or minus, of angle OF and O'F' corresponding to the sign of $\psi$.

Thus, the gyro cases 117 and 117' indicate the angle of deviation corresponding to the azimuth of the aforementioned azimuth detecting element, whereby the azimuth can be detected. However, in this case the detecting element is not provided with the faculty of pointing north by itself as in case of gyro compasses generally used. The reason is as follows. Since gyro cases 117 and 117' are coupled together within vertical ring 120 in such a manner that they can not deviate in the same direction with respect to the ring, if they should be forced to deviate in the same direction they would be obliged to turn together with the vertical ring as a body. But since, during this turning movement, the directions of rotation of the gyros contained in the gyro cases are opposite to each other, their gyro actions cancel each other to leave no gyroscopic action when they are effectively fixed to the vertical ring as a body, and therefore they have no faculty to maintain a determined azimuth in space. Accordingly, they lack the ability of pointing north by themselves, that is to say, the so-called north seeking force.

Therefore, in this invention, a free gyro 101 is employed in order to provide the north seeking force to the gyro compass. The deviation angles of gyro cases 117 and 117' are detected as a voltage across the deviation angle detecting device or the azimuth detecting device as described before, and this voltage after being amplified is applied to a torque generating device 108 (Figs. 11 and 15) to produce a torque which causes the free gyro 101 to precess. Thus the frame body 104 is turned and the azimuth detecting element will also be turned. In this case, the direction of action of the torque generated by the torque generating device 108 is selected so that the direction of precession of the free gyro is towards the north. If the free gyro is pointed to a direction deviated from north, the azimuth detecting element is pointed to the azimuth corresponding to that of free gyro 101, and the gyro cases 117 and 117' will also be deviated to an extent corresponding to this azimuth, so that a torque will act on the free gyro 101 corresponding to the deviation to cause a precession, turning the free gyro toward north, and the frame body 104 and the azimuth detecting element will also turn toward north with it. It is clear from Equation 1 that as the azimuth becomes closer to north, the deviation angles OF and O'F' of the gyro case will be decreased.

Thus, when the gyro points north, the deviation angles OF and O'F' become zero, and no torque acts on the free gyro, which comes to rest at that position. i.e., at the north pointing position. In practice, the gyro cases 117 and 117' effect damped oscillations, and during the interval of the damped oscillations, since the free gyro precesses in conformance with the deflection angle at each instant, the gyro ordinarily effects the damped oscillation superposed on its motion in turning gradually toward north, until it comes to rest pointing north.

The rate of damping of this damped oscillation is determined by the strength of the torque of the torque generating device and the moments about the axes 118, 119 and 118', 119' of damping weights 133, 134 and 133', 134' mounted upon gyro cases 117 and 117' (Fig. 12), and the period of oscillation is determined by the coefficient of rigidity of piano wires 122 and 122' and the pendulous moment about the axis 121, 121' of the azimuth detecting device. Since the acceleration error is determined substantially by this pendulous moment, and the coefficient of rigidity of the piano wires has no direct relation with respect to the acceleration, the period of damped oscillation can be determined at will by suitably selecting the coefficient of rigidity, without increasing the acceleration error excessively. According to this invention, since the regulation can be accomplished merely by proper selection of piano wires as stated above, this invention has the advantage of making the construction of the device remarkably simple.

What I claim is:

1. A gyro-compass comprising, in combination, an azimuth indicating frame means mounted to rotate about a substantially vertical azimuth axis and rotatable to a neutral north-indicating position, a free gyro unit in neutral equilibrium and in a position representative of a north indicating position, and a gravity-controlled gyro unit in equilibrium in a position representative of a north indicating position for detecting deviation of the free gyro unit and the frame means from said position representative of said north indicating position, each of said gyro units being separately mounted on the frame means for angular rotation around respective horizontal axes substantially normal to the first-mentioned axis, means mounting the gravity-controlled gyro unit on said frame means with its horizontal axis displaced to one side of said vertical axis of the frame means and including elastic means pendulously mounting the gravity-controlled gyro unit for rotational movement about a second vertical axis to allow angular displacement relative to said frame means, means for applying to the free gyro unit about its horizontal axis a torque in a direction to effect a precession in a direction tending to impart a north-seeking property to the frame means as a whole, said last-mentioned means comprising means under control of the gravity-controlled gyro unit for sensing said displacement relative to said north indicating position and for causing said last-mentioned means in response to said angular displacement to impress said torque on said free gyro unit in an amount related to the magnitude of angular displacement, and means fixed to the frame means mounting the free gyro unit on said frame means for rotation about its horizontal axis and for transmitting rotational forces generated during said precession to said frame means tending to impart said north-seeking property thereto so that during said precession the free gyro unit applies damping forces to said gravity-controlled unit as the last-mentioned unit oscillates on its vertical axis.

2. A gyro-compass comprising, in combination, an azimuth indicating frame means mounted to rotate about a substantially vertical azimuth axis and rotatable to a neutral north indicating position, a free gyro unit in neutral equilibrium and in a position representative of a north indicating position, and a gravity-controlled gyro unit in equilibrium in a position representative of a north indicating position for detecting deviation of the free gyro unit and the frame means from said position representative of said north indicating position, each of said gyro units being separately mounted on the frame means for angular rotation around respective horizontal axes substantially normal to the first-mentioned axis, means mounting the gravity-controlled gyro unit on said frame means with its horizontal axis displaced to one side of said vertical axis of the frame means and including elastic means pendulously mounting the gravity-controlled gyro unit for rotational movement about a second vertical axis to allow angular displacement relative to a datum on said frame means, means for applying to the free gyro unit about its horizontal axis a torque in a direction to effect a precession in a direction tending to impart a north-seeking property to the frame means as a whole, said last-mentioned means comprising means under control of the gravity-controlled gyro unit for sensing said displacement relative to said datum and for causing said last-mentioned means in response to said angular displacement to impress said torque on said free gyro unit in an amount related to the magnitude of angular displacement, and means fixed to the frame means mounting the free gyro unit on said frame means for rotation about its horizontal axis and for transmitting rotational forces generated during said precession to said frame means tending to impart said north-seeking property thereto so that during said precession the free gyro unit applies damping forces to said gravity-controlled unit as the last-mentioned unit oscillates on its vertical axis.

3. A gyro-compass comprising, in combination, an azimuth indicating frame means mounted to rotate about a substantially vertical azimuth axis and rotatable to a neutral north indicating position, a free gyro unit in neutral equilibrium and in a position representative of a north idicating position, and a gravity-controlled gyro unit in equilibrium in a position representative of a north indicating position for detecting deviation of the free gyro unit and the frame means from said position representative of said north indicating position, each of said gyro units being separately mounted on the frame means for angular rotation around respective horizontal axes substantially normal to the first-mentioned axis, means mounting the gravity-controlled gyro unit on said frame means with its horizontal axis displaced to one side of said vertical axis of the frame means and including elastic means pendulously mounting the gravity-controlled gyro unit for rotational movement about a second vertical axis to allow angular displacement relative to a datum on said frame means, induction means for applying to the free gyro unit about its horizontal axis a torque in a direction to effect a precession in a direction tending to impart a north-seeking property to the frame means as a whole, means comprising electromagnetic circuit means under control of the gravity-controlled gyro unit for sensing said displacement relative to said datum and for causing said induction means in response to said angular displacement to impress said torque on said gyro unit in an amount related to the magnitude of angular displacement, and means fixed to the frame means mounting the free gyro unit on said frame means for rotation about its horizontal axis and for transmitting rotational forces generated during said precession to said frame means tending to impart said north-seeking property thereto so that during said precession the free gyro unit applies damping forces to said gravity-controlled unit as the last-mentioned unit oscillates on its vertical axis.

4. A gyro-compass comprising, in combination, an azimuth indicating frame means mounted to rotate about a substantially vertical azimuth axis and rotatable to a neutral north indicating position, a free gyro unit in neutral equilibrium and in a position representative of a north indicating position, and a gravity-controlled gyro unit in equilibrium in a position representative of a north indicating position for detecting deviation of the free gyro unit and the frame means from said position representative of said north indicating position, each of said gyro units being separately mounted on the frame means for angular rotation around respective horizontal axes substantially normal to the first-mentioned axis, means mounting the gravity-controlled gyro unit on said frame means with its horizontal axis displaced to one side of said vertical axis of the frame means and including elastic means pendulously mounting the gravity-controlled gyro unit for rotational movement about a second vertical axis to allow angular displacement relative to a datum on said frame means, induction means for applying to the free gyro unit about its horizontal axis a torque in a direction to effect a precession in a direction tending to impart a north-seeking property to the frame means as a whole, means comprising electromagnetic circuit means under control of the gravity-controlled gyro unit for sensing said displacement relative to said datum and for causing said induction means in response to said angular displacement to impress said torque on said free gyro unit in an amount related to the magnitude of angular displacement, means fixed to the frame means mounting the free gyro unit on said frame means for rotation about its horizontal axis and for transmitting rotational forces generated during said precession to said frame means tending to impart said north-seeking property thereto so that during said precession the free gyro unit applies damping forces to said gravity-controlled unit as the last-mentioned unit oscillates on its vertical axis, and another induction means operably connected to said electromagnetic circuit means for applying to the frame means at its vertical axis a torque magnitude-related to said displacement of the gravity-controlled gyro unit and for applying said last-mentioned torque in response to said displacement relative to said datum.

References Cited in the file of this patent

UNITED STATES PATENTS

| | | |
|---|---|---|
| 1,186,856 | Sperry | June 13, 1916 |
| 1,386,029 | Rossiter | Aug. 2, 1921 |
| 1,453,103 | Gott | Apr. 24, 1923 |
| 1,687,955 | Tanner | Oct. 16, 1928 |
| 1,930,082 | Boykow | Oct. 10, 1933 |
| 1,950,517 | Rawlings | Mar. 13, 1934 |
| 2,109,283 | Boykow | Feb. 22, 1938 |
| 2,220,055 | Fischel | Oct. 29, 1940 |
| 2,222,754 | Von Freydorf | Nov. 26, 1940 |
| 2,414,448 | Carter | Jan. 21, 1947 |
| 2,419,948 | Haskins | May 6, 1947 |